United States Patent Office 3,501,455
Patented Mar. 17, 1970

3,501,455
PHENYLAZOTHIOFORMAMIDE-S-OXIDES
Christofeel Willem Pluijgers, Utrecht, Netherlands, assignor, by mesne assignments, to U.S. Philips Corporation, New York, N.Y., a corporation of Delaware
No Drawing. Filed Oct. 11, 1965, Ser. No. 494,901
Claims priority, application Netherlands, Oct. 10, 1964, 6411821
Int. Cl. C07c *161/06;* A01m *9/12;* A61k *27/00*
U.S. Cl. 260—192                                   5 Claims

ABSTRACT OF THE DISCLOSURE

Phenylazothioformamide-S-oxides substituted with chlorine, alkyl, alkoxy, hydroxy or alkylmercapto radicals on the benzene ring. Examples are phenylazothioformamide-S-oxide and 4-methylphenylazothioformamide-S-oxide. The compounds have fungicidal and bactericidal activities.

---

It is know that phenylthiosemicarbazides have a fungicidal activity. It was found now, that oxidation products of the said compounds have a fungicidal activity which is a few times higher and in addition have an interesting bactericidal activity.

In accordance herewith the invention relates to compounds with fungicidal and bactericidal properties of the general formula:

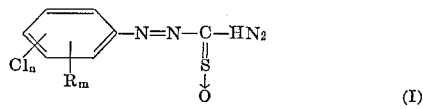

(I)

in which formula R represents a hydroxyl group, an alkyl group, an alkoxy group or an alkylmercapto group which contains 1 to 4 carbon atoms and $n$, $m$ and $n$ plus $m$ is 0, 1, 2 or 3.

These compounds can be prepared according to methods which are known for the preparation of this type of compounds and according to methods analogous thereto.

For example, they can be prepared by oxidizing a compound of the general formula:

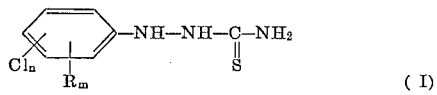

(I)

in which formula R, $m$ and $n$ have the above meanings.

This oxidation may be carried out, for example, by slowly adding the oxidizing agent to a solution or a suspension of the starting material in water.

Alternatively, a solution of the starting substance in an organic solvent, for example, dimethylformamide, dimethylsulphoxide or acetone, may be added to the oxidizing agent preferably dissolved in water.

As oxidizing agent may be used, for example, hydrogen peroxide. Preferably an excess of oxidizing agent is used.

It has been found in biological experiments that the compounds according to the invention have an interesting fungicidal and bactericidal activity, while they are phytotoxic only to a very small extent.

As a result of these properties the compounds according to the invention can successfully be used as active constituents in agents for the control of fungi or bacteria and for the protection against fungi or bacteria infections. The agents may be used both in agriculture and silviculture and for seed treatment, and also in industry, for example in the textile or paper industry.

The agent may be used in the conventional manner. They may be scattered, sprayed or atomized, depending on the circumstances and on the object for which they are used.

Since so many factors, for example, humidity, temperature, other climatological conditions, nature of the infection (to be expected), object to be protected or disinfected, are of importance in determining the mode of application and the dose of application, no general rules can be given therefor. However, those skilled in the art will experience no difficulties to obtain good results.

The fungicidal activity of the compounds according to the invention was proved inter alia in in vitro experiments.

It was found in the so-called roll-culture test that the compounds prevent mould growth even in very low concentrations. One drop of a spore suspension of a fungus was added, together with one drop of an aqueous solution of the substance to be tested, to 1.5 mm. of melted glucose agar in a small bottle. By rapidly rotating the bottle around its axis, and simultaneously cooling it, the agar formed a thin layer against the wall. After a 3-day incubation at 24° C the minimum concentration of a substance needed to just prevent fungal growth was determined. The experiment was carried out with *Botrytis allii* (B), *Penicillium italicum* (P), *Aspergillus niger* (A) and *Cladosporium cucumerinum* (C). The results expressed in mg. per liter, are shown, in the table below.

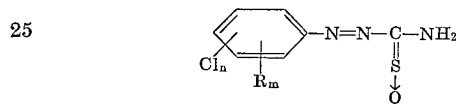

| $Cl_n/R_m$ | B | P | A | C |
|---|---|---|---|---|
|  | 0.5 | 0.2 | 0.2 | 0.2 |
| 4 Cl | 1 | 0.2 | 0.5 | 0.2 |
| 4 CH₃ | 1 | 0.5 | 1 | 0.5 |
| 4 OCH₃ | 2 | 1 | 5 | 3 |

In two other in vitro experiments the fungicidal activity of phenylazothioformamide-S-oxide was measured in comparison with the known phenyl thiosemicarbazide.

SPORE GERMINATION TEST

One drop of an aqueous suspension or solution of the substance to be investigated was mixed with one drop of an aqueous spore suspension of *Fusarium culmorum* (F) or *Venturia inaequalis* (V). After storing the mixture at 22 to 23° C. in a closed box for 24 hours, it was determined at what concentration (mg./ml.) the substances to be investigated give complete inhibition of germination.

| Compound | F | V |
|---|---|---|
| Phenylthiosemicarbazide | 6×10⁻⁵ | 2×10⁻⁵ |
| Phenylazothioformamide-S-oxide | 2×10⁻⁶ | 2×10⁻⁶ |

MYCELIUM GROWTH EXPERIMENT

A culture tube, kept in horizontal position, was provided with a layer of potato glucose agar in which the substance to be investigated had been suspended; subsequently an agar sponge overgrown with *Botrytis cinerea* (B) or *Alternaria solani* (A) was placed on the agar layer. After storing the cultures in an incubator at 22 to 23° C. for 3 days (for Botrytis) and 8 days (for Alternaraia) respectively, the linear growth of the cultures was measured. The growth was expressed in percent of the growth of the blanks.

| Compound | B | | A | |
|---|---|---|---|---|
|  | 10⁻⁴ | 3×10⁻⁵ | 10⁻⁴ | 3×10⁻⁵ |
| Phenylthiosemicarbazide | 0 | 26 | 37 | 56 |
| Phenylazothioformamide-S-oxide | 0 | 0 | 0 | 37 |

In in vivo experiments also the substances according to the invention were found to have a high fungicidal activity. For phenylazothioformamide-S-oxide, for example, this was found inter alia in experiments with Phytophthora infestans on tomato leaves and Venturia inaequalis on apple plants.

These experiments were carried out as follows:

PHYTOPHTHORA LEAF TEST

Detached tomato leaves were sprayed on the lower side with an aqueous suspension of the usbstance to be investigated in various concentrations in a quantity of 5 ml. of suspension per 1000 cm.$^2$ of leaf. After drying the leaves were infected, also on the lower side, with zoo spores of Phytophthora infestans which had been obtained from zoosporangia of the fungus cultivated on potato tubers. The leaves were placed with their stems in a bottle of water and incubated in a climate room at 100 percent relative humidity, at first 24 hours at 15° C. in the dark, subsequently 48 hours at 18° C. under fluorescent light (light intensity on the leaves 3000 to 6000 Lux). The extent of infestation was determined and expressed in percent of the infestation of the blanks.

| Compound | $3 \times 10^{-4}$ | $3 \times 10^{-5}$ |
|---|---|---|
| Phenylthiosemicarbazide | 13 | 45 |
| Phenylazothioformamide-S-oxide | 0 | 6 |

VENTURIA TEST

Young apple seedlings approximately of 15 cm. height having 6 to 8 leaves were sprayed with an aqueous suspension of $10^{-3}$ or $10^{-4}$ g./liter in a quantity of 2 ml. per plant. After the spray liquid had been evaporated, every plant was sprayed with 3 ml. of a suspension of conidia in water (180,000/ml.) obtained from apple leaves infested with Venturia inaequalis. The leaves were sprayed in a greenhouse and kept moist for 48 hours by spraying them and covering them with plastic sheets. After a fortnight, the growth of the fungus was determined and expressed in percent of the infestation of untreated leaves. A suspension of $10^{-3}$ g./liter gave full protection, a suspension of $10^{-4}$ g. per liter a protection of 99%.

In addition it has been found that the compounds according to the invention also have a systemic fungicidal activity.

This activity was found inter alia for phenylazothioformamide-S-oxide in an experiment in which cucumber seedlings ("lange gele tros") of approximately one week old were placed with their roots in a solution of the substance for two days and then inoculated with a spore suspension. The plants were placed in water and stored at 15 to 20° C. for 7 days. It was found that the substance gave protection both against cladosporium cucumerinum and against colleto trichum lagenarium in a concentration of 100 mg./l.

The bactericidal activity of the compounds according to the invention was found inter alia in an experiment in which on culture media of glucose agar (pH 6.8) the bacteria Escherichia coli (E), Bacillus subtilis (B), Pseudomonas fluorescens (P) and Mycobacterium phlei (M) were incubated with increasing quantities of the substance to be tested. After an incubation of 4 days at 37, 37, 24 and 30° C. respectively it was determined at what concentration of the investigated substance just no bacteria growth occurred any longer.

For phenylazothioformamide-S-oxide, for example, the following concentrations were found.

| Bacteria: | Mg./l. |
|---|---|
| E | 2 |
| B | 0.5 |
| P | 5 |
| M | 0.5 |

In spite of the high fungitoxicity and the strong bactericidal activity of phenylazothioformamide-S-oxide this substance has a surprisingly low phytotoxic activity. This was found inter alia in experiments in which tomato leaves and dwarf bean plants were sprayed with a 1% suspension in water. The dwarf bean plants experienced a very small harmful activity, while on the tomato plants only very insignificant spots could be observed.

The agents according to the invention include the known forms in which fungicidal and bactericidal substances can be formulated for use, in which the active substance is mixed with or dissolved in a solid or liquid carrier to which a surface-active substance, a dispersing agent or sticker may be added, for example, dusts, smoke generators, aerosols, dispersions and emulsions. In dispersions and emulsion water is preferably used as the diluent, in which as so-called primary compositions readily water-dispersible powders, wettable powders, and water-emulsifiable oils or pastes are prepared as fungicidal compositions which are diluted with water only shortly before or during spraying.

The concentration of the active substance in the compositions according to the invention can consequently be varied within very wide limits, for example, from 95% in a wettable powder which would contain, in addition to the active substance, only a dispersing agent, to, for example, 0.001% by weight in an aqueous liquid to be sprayed. Dusts according to the invention are obtained by intimately mixing the active substance of Formula I, for example, grinding it together with an inert solid carrier material, for example, in a concentration of 1 to 50% by weight. As examples of suitable carriers may be mentioned talcum, kaolin, pipe clay, diatomaceous earth, dolomite, gypsum, chalk, bentonite or attapulgite and mixtures of these and similar substances. Alternatively, organic carriers, for example, ground shells of walnuts may be used.

Wettable powders according to the invention contain the active substance of Formula I, at least one dispersing agent for which are to be considered, for example, the agents known for this purpose, such as lignin sulphonate, alkyl naphthalene sulphonates, in addition preferably also a wetting agent for which are to be considered, for example, fatty alcohol sulphates, alkyl aryl sulphonates or fatty acid condensation products, for example, those known under the trade name "Igepon," while in addition an inert solid carrier is preferably added to such a mixture. For example, a wettable powder is obtained by mixing the active substance with 1 to 5 parts by weight of a dispersing agent, 1 to 5 parts by weight of a wetting agent, and 10 to 80 parts by weight of one of the above solid inert carriers. For the preparation of miscible oils, the active compound is dissolved or finely divided in a suitable solvent which preferably is poorly miscible with water and to this solution is added an emulsifier. Suitable solvents are, for example, xylene, toluene, petroleum distillates, which are rich in aromatics, for example, solvent naphtha, distilled tar oil and mixtures of the said liquids. As emulsifiers may be used, for example, alkyl-phenoxy-polyglycol ethers, polyoxy ethylene sorbitan esters of fatty acids, or polyoxyethylene sorbitol esters of fatty acids. The concentration of the active compound in these miscible oils is not restricted to narrow limits, and may vary, for example, between 2 and 50% by weight. In addition to these wettable powders and miscible oils may be mentioned also as a highly concentrated primary composition a solution of the active substance in a readily water-miscible liquid, for example, acetone, to which solution a dispersing agent and, if required, a wetting agent are added. On diluting with water shortly before or during spraying an aqueous dispersion of the active substance is obtained.

The atomisation and the spraying of the agents according to the invention is effected in the conventional manner in a concentration which is adapted to the circumstances and which is not restricted to narrow limits and will lie, for example, between 0.01 and 5% and usually, between 0.01 and 0.5% by weight.

An aerosol preparation according to the invention is obtained in the conventional manner by incorporating the active substance, if required in a solvent, in a volatile liquid to be used as a propellant, for example, the mixture of chloro-fluoro derivatives of methane and ethane obtainable in trade under the trade name Freon.

Fumigating candles or fumigating powders, that is to say, preparations which can produce a fungicidal smoke by burning, are obtained by incorporating the active substance of Formula I in a combustible mixture which contains, for example, as a fuel a sugar or wood, preferably in a ground form, a substance for maintaining combustion, for example, ammonium nitrate or potassium chlorate and in addition a substance to delay the combustion, for example, kaolin, bentonite and/or colloidal silica.

In addition to the above ingredients, the compositions according to the invention may also contain other substances, commonly used in this type of agents.

For example, a lubricant, such as calcium stearate or magnesium stearate, may be added to a dusting powder. Alternatively, for example, "stickers" such as polyvinyl alcohol, cellulose derivatives or other colloidal materials, such as casein, may be added to improve the adherence of the fungicidal composition to the surface to be protected.

If required, other pesticidal substances, for example, insectidies, acaricides, or also other fungicides may be incorporated in the compositions according to the invention, when a wider pesticidal activity is aimed at.

In order that the invention may readily be carried into effect, it will now be described, in greater detail, by way of example, with reference to the following specific examples.

Example 1

50 g. of 1-phenyl thiosemicarbazide in 175 ml. of dimethyl formamide were added in one portion to 2600 ml. of $H_2O_2$ solution obtained from 2250 ml. of water and 350 ml. of a 30% aqueous $H_2O_2$ solution. The temperature of the solution which was vigorously stirred, was kept at 30° C. by cooling with ice. During the reaction red crystals separated. When no heat of reaction was given off any longer, stirring was continued at room temperature for 1 hour. The reaction mixture was then cooled to 5° C., the precipitate was sucked off and washed 5 times with icewater. The reaction product was dried. Yield: 23 g. Melting point 106–108° C. (decomposition). Further purification was obtained by dissolving the substance in methanol/benzene (1:10), filtering it and precipitating it by the addition of petroleum ether (boiling point 40–60° C.). Melting point 108–110° C. (decomposition).

Example 2

In a quite similar manner were oxidized 1-(p-chlorophenyl) thiosemicarbazide, 1-(p-methylphenyl) thiosemicarbazide and 1-(p-methoxyphenyl)-thiosemicarbazide. The melting points of the resulting red oxidation products are 140–141, 5° C., 133–134° C. and 125–126° C., respectively.

Example 3

| | Parts by wt. |
|---|---|
| 4-methylphenylazothioformamide-S-oxide | 25 |
| Attaclay | 40 |
| Kaolin | 25 |
| Polyfon H (West Virginia Co.) | 7 |
| Sodium oleyl-N-methyltaurate | 3 | were ground in a mill to a wettable powder.

Example 4

| | Parts by wt. |
|---|---|
| Phenylazothioformamide-S-oxide | 50 |
| Sodium dodecylbenzene sulphonate | 3 |
| Sodium lignine sulphonate (Trademark Polyfon H) | 7 |
| Kaolin | 40 | were ground together to a wettable powder.

Example 5

A water-miscible oil is obtained by incorporating 25 parts by weight of 4-chlorophenylazothioformamide-S-oxide together with 5 parts by weight of a mixture (1:1) of alkyl phenol polyglycol ether and calcium dodecylbenzene sulphonate in 70 parts by weight of xylene.

Example 6

A smoke generating candle was composed containing 16 g. of 4-methoxyphenylazothioformamide-S-oxide.

| | G. |
|---|---|
| Sandal wood | 15 |
| Wood dust | 12 |
| Colloidal silica | 3 |
| Bentonite | 4 |
| Ammonium nitrate | 40 |

Example 7

For an aerosol preparation 10 g. of 4-hydroxyphenylazothioformamide-S-oxide are dissolved in 20 ml. of methylene chloride and incorporated in 80 g. of Freon.

Example 8

A dust formulation is prepared by grinding 3 g. of 4 methylmercaptophenylazothioformamide-S-oxide together with 10 g. of Attaclay and 87 g. of talcum.

What is claimed is:
1. A phenylazo compound of the formula:

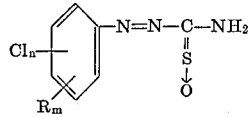

wherein R is a substituent of the group consisting of hydroxyl, alkyl, alkoxy and alkylmercapto wherein each of said substituents containing carbon contains from 1 to 4 carbon atoms inclusive, $n$ and $m$ are each whole numerals from 0 to 3 inclusive and the sum of $m$ plus $n$ does not exceed 3.

2. Phenylazothioformamide-S-oxide.
3. 4-chloro-phenylazothioformamide-S-oxide.
4. 4-methyl-phenylazothioformamide-S-oxide.
5. 4-methoxy-phenylazothioformamide-S-oxide.

References Cited

UNITED STATES PATENTS 2,441,396  5/1948  Corwin et al. _____ 260—192

OTHER REFERENCES

Giua et al., C.A. vol. 20, p. 1062 (1926).
Fairfull et al., C. A., vol. 46, p. 9530h (1952).

FLOYD D. HIGEL, Primary Examiner

U.S. Cl. X.R.

21—76; 71—99; 252—8.8; 260—552; 424—226